US007760242B2

(12) United States Patent
Anabuki

(10) Patent No.: US 7,760,242 B2
(45) Date of Patent: Jul. 20, 2010

(54) INFORMATION PROCESSING METHOD AND INFORMATION PROCESSING APPARATUS

(75) Inventor: Mahoro Anabuki, Cambridge, MA (US)

(73) Assignee: Canon Kabushiki Kaisha, Tokyo (JP)

( * ) Notice: Subject to any disclaimer, the term of this patent is extended or adjusted under 35 U.S.C. 154(b) by 1133 days.

(21) Appl. No.: 11/235,012

(22) Filed: Sep. 26, 2005

(65) Prior Publication Data

US 2006/0071945 A1    Apr. 6, 2006

(30) Foreign Application Priority Data

Sep. 28, 2004  (JP) ............................ 2004-281310

(51) Int. Cl.
*H04N 5/228* (2006.01)
(52) U.S. Cl. ................. 348/222.1; 348/42; 348/208.14; 348/211.11
(58) Field of Classification Search ................ 345/633; 348/41, 135, 139, 208.14, 211.11
See application file for complete search history.

(56) References Cited

U.S. PATENT DOCUMENTS

| 6,064,749 | A * | 5/2000 | Hirota et al. ................ 382/103 |
| 6,657,637 | B1 * | 12/2003 | Inagaki et al. ............... 345/629 |
| 7,312,795 | B2 * | 12/2007 | Aso et al. .................... 345/419 |
| 2003/0227470 | A1 * | 12/2003 | Genc et al. .................. 345/633 |
| 2004/0001074 | A1 * | 1/2004 | Oyaizu ....................... 345/633 |

OTHER PUBLICATIONS

Haralick, et al., "Review and analysis of solutions of the three point perspective pose estimation . . . ", International Journal of Computer Vision, vol. 13, No. 3, pp. 331-356, 1994.
Lowe, "Fitting parameterized three-dimensional models to images", IEEE Transactions on PAMI, vol. 13, No. 5, pp. 441-450, 1991.
Baratoff, et al., "Interactive multi-marker calibration for augmented reality applications", Proc. ISMAR2002, pp. 107-116, 2002.
Kishino, et al., "A Translucent Visual Marker with Autonomous Mobility on Computer Display", Intarakushon 2002, vol. 2002, No. 7, pp. 14-21, Mar. 2002.
Takahashi, et al., "A High Accuracy Realtime 3D Measuring method of Marker for VR Interface by . . . ", 3D Image Conference 96, Niigata University, pp. 167-172, Jul. 1996.
Rekimoto, "Augmented Reality using the 2D matrix code", Intarakuthibu sisutemu to sofutowea IV, Kindai-kagaku-sya, pp. 199-208, Dec. 1996.
Bimber, et al. , "Alternative Augmented Reality Approaches: Concepts, Techniques and Applications", Granada Spain, Eurographics 2003.

\* cited by examiner

*Primary Examiner*—Gevell Selby
(74) *Attorney, Agent, or Firm*—Canon U.S.A., Inc. I.P. Division

(57) ABSTRACT

An information processing method includes steps of: acquiring arrangement information indicating the position or the position and orientation of an index arranged in a physical space; capturing an image in the physical space; detecting the index from the captured image; and calculating the position and/or orientation of a viewpoint of the captured image based on the arrangement information and the detected index.

15 Claims, 7 Drawing Sheets

INFORMATION PROCESSING METHOD AND INFORMATION PROCESSING APPARATUS

BACKGROUND OF THE INVENTION

1. Field of the Invention

The present invention relates to an information processing method and an information processing apparatus that use information indicating the image coordinates in a captured image of indices arranged in the physical space to calculate the position and/or orientation of a camera viewpoint.

2. Description of the Related Art

Mixed reality has been much researched in recent years for the purpose of realizing seamless combination of the physical space and a virtual space. An image display apparatus presenting the mixed reality adopts a video-see-through technology in which an image of a virtual space (for example, a virtual object or characteristic information drawn by computer graphics) generated in accordance with the position and orientation of the viewpoint of an image capture apparatus, such as a video camera, is superimposed on the image in the physical space, captured by the image capture apparatus, and the superimposed image is displayed.

Such image display apparatuses are expected to be applied to new fields different from known virtual reality. The fields includes an operation aid superimposing an image inside the body of a patient on the body surface and displaying the superimposed image and a mixed reality game in which an operator battles against a virtual enemy floating in the physical space.

Such an application commonly requires accurate registration of the physical space with the virtual space and many efforts have been made hitherto in order to achieve accurate registration. Problems about the registration in the mixed reality are involved in the calculation of the position and orientation of the viewpoint in the physical space, that is, in a world coordinate system (a coordinate system in which one point in the physical space is defined as the origin and three axes orthogonal to each other are defined as an X axis, a Y axis, and a Z axis).

Generally, in order to solve these problems, a plurality of indices are arranged in the physical space, and the coordinates in the world coordinate system of the indices and the coordinates of projected images of the indices in an image captured by an image capture apparatus are used to calculate the position and orientation of the viewpoint in the physical space. Calculation methods in, for example, photogrammetry have been suggested (see R. M. Haralick, C. Lee, K. Ottenberg, and M. Nolle, "Review and analysis of solutions of the three point perspective pose estimation problem," *International Journal of Computer Vision*, Vol. 13, No. 3, pp. 331-356, 1994 and D. G. Lowe, "Fitting parameterized three-dimensional models to images," *IEEE Transactions on PAMI*, Vol. 13, No. 5, pp. 441-450, 1991).

In the above methods, it is required that the accurate coordinate values of the indices in the world coordinate system are known. That is, it is necessary to measure (calibrate) the accurate coordinate values of the indices in the world coordinate system by a certain method. Accordingly, the coordinate values are generally measured by using a ruler or survey instrument prior to the calculation of the position and orientation of the viewpoint or measured in advance by using a calibration tool disclosed in, for example, G. Baratoff, A. Neubeck, and H. Regenbrecht, "Interactive multi-marker calibration for augmented reality applications," *Proc. ISMAR2002*, pp. 107-116, 2002.

However, there is a problem in that the indices should not be moved in the calculation of the position and orientation of the viewpoint because known calibration methods are performed before the calculation of the position and orientation of the viewpoint.

Since objects (for example, the hands of a user or objects operated by the user) other than the indices exist in the physical space and the positions of the objects can be shifted, the objects can block the space between the indices arranged in the physical space and the viewpoint in some cases to interfere the calculation of the position and orientation of the viewpoint. In such cases, there may be a need to move the indices shaded behind the objects.

In order to resolve this problem, moving indices are suggested. For example, Yasue Kishino, Masahiko Tsukamoto, Hiroshi Sakane, Shojiro Nishio, "A Translucent Visual Marker with Autonomous Mobility on Computer Display", Proc. Interaction 2002, Information Processing Society of Japan, Vol. 2002, No. 7, pp. 14-21, March 2002 (hereinafter Yasue Kishino et al.) discloses a method of realizing indices that are displayed in the screen of a computer and that is capable of autonomous movement. However, with the method disclosed in Yasue Kishino et al., the indices are only movable and it is not possible to calculate the positions in the world coordinate system of the indices after the movement. Accordingly, it may be impossible to use such a method in order to calculate the position and orientation of the viewpoint in the world coordinate system.

SUMMARY OF THE INVENTION

It is desirable to accurately calculate the position and/or orientation of a viewpoint of a captured image even when indices used for calculating the position and/or orientation of the viewpoint of the captured image move.

According to an aspect of the present invention, an information processing method includes steps of: acquiring arrangement information indicating the position or the position and orientation of an index arranged in a physical space; capturing an image in the physical space; detecting the index from the captured image; and calculating the position and/or orientation of a viewpoint of the captured image based on the arrangement information and the detected index.

According to another aspect of the present invention, an information processing method includes steps of: projecting an index on a physical space; acquiring arrangement information indicating the position or the position and orientation of the index; capturing an image in the physical space; detecting the index from the image; and calculating the position and/or orientation of a viewpoint of the image based on the arrangement information and the detected index.

According to yet another aspect of the present invention, an information processing apparatus includes: a first shooting unit configured to shoot a physical space; an index detecting unit configured to detect an index in an image in the physical space shot by the first shooting unit; an index-arrangement-information detecting unit configured to detect arrangement information indicating the position or the position and orientation of the index in the physical space; an index-arrangement calculating unit configured to calculate the position or the position and orientation of the index in the physical space based on the arrangement information; and a viewpoint position-orientation calculating unit configured to calculate the position and/or orientation in the physical space of a viewpoint of the first shooting unit from the detection result by the index detecting unit and the calculation result by the index-arrangement calculating unit.

According to still another aspect of the present invention, an information processing apparatus includes: a shooting unit configured to shoot a physical space; an index detecting unit configured to detect an index in an image in the physical space shot by the shooting unit; an index-image generating unit configured to hold arrangement information indicating the position or the position and orientation of the index in the physical space and to generate an image of the index; an index projecting unit configured to project the image of the index at the position or the position and orientation indicated by the arrangement information and/or an index display unit configured to display the image of the index at the position or the position and orientation indicated by the arrangement information; and a viewpoint position-orientation calculating unit configured to calculate the position and/or orientation in the physical space of a viewpoint of the shooting unit from the detection result by the index detecting unit and the arrangement information held by the index-image generating unit.

According to exemplary embodiments of the present invention, it is possible to move the indices used in the calculation of the position and orientation of the viewpoint even in the calculation. Furthermore, it is possible to accurately calculate the position and/or orientation of the viewpoint even when the indices used in the calculation of the position and/or orientation of the viewpoint of the captured image move.

Further features of the present invention will become apparent from the following description of exemplary embodiments with reference to the attached drawings.

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the present invention will be described in detail in accordance with the accompanying drawings.

First Embodiment

According to a first embodiment of the present invention, an image captured by an objective view camera mounted on, for example, a ceiling is used to calculate the positions of indices in the physical space or the positions and orientations thereof in the physical space. A system using a position-orientation calculating apparatus and a position-orientation calculating method, according to the first embodiment, to present mixed reality to a user will be described below.

Figure 1:
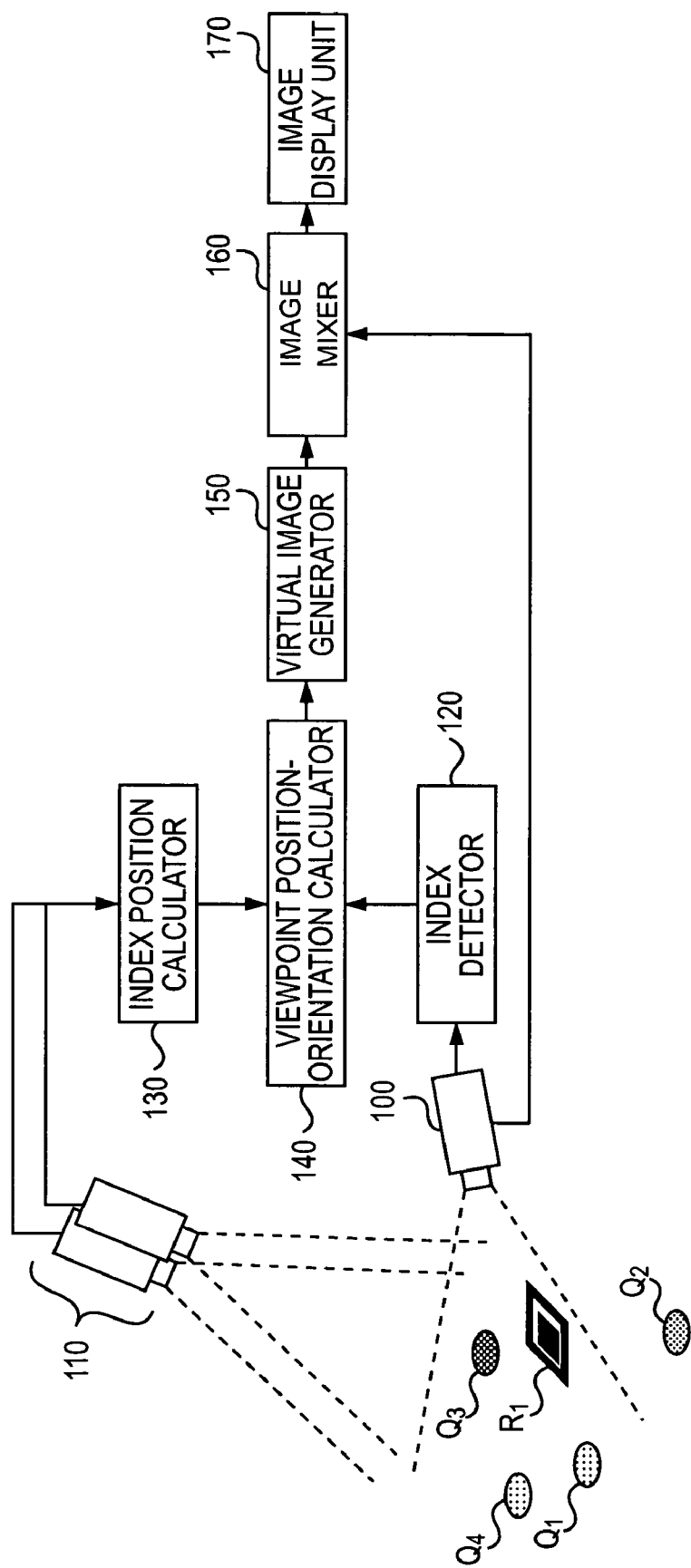
FIG. 1 illustrates an exemplary structure of a position-orientation calculating apparatus according to the first embodiment of the present invention.

FIG. 1 illustrates an exemplary structure of the position-orientation calculating apparatus according to the first embodiment. Referring to FIG. 1, the position-orientation calculating apparatus includes a subjective view camera 100, an objective view camera 110, an index detector 120, an index position calculator 130, a viewpoint position-orientation calculator 140, a virtual image generator 150, an image mixer 160, and an image display unit 170.

A plurality of indices whose positions in the world coordinate system are unknown and which are shot by the subjective view camera 100 and the objective view camera 110 are arranged in a plurality of positions in the physical space.

The indices may be circular or elliptical markers having different colors or may be feature points having different textural features. Alternatively, rectangular indices that are rectangular monochrome areas each having a certain area may be used. Any identifiable indices may be used as long as the image coordinates of a projected image on the image is detectable.

The indices are capable of being moved by a user with his/her hand. Alternatively, the indices may be mounted on a small device that is capable of autonomous movement to move the indices without any operation of the user. However, it is desirable that the indices be arranged such that at least three point indices or one or more polygonal indices are always observed by the subjective view camera 100. In the structure shown in FIG. 1, four point indices $Q_1$, $Q_2$, $Q_3$, and $Q_4$ and one rectangular index $R_1$ are arranged, and the point indices $Q_1$, $Q_3$, $Q_4$, and the rectangular index $R_1$ are located within the field of view of the subjective view camera 100.

The subjective view camera 100 shoots the physical space having the indices arranged therein. The viewpoint of the subjective view camera 100 is movable and the position and/or orientation of the viewpoint is a target of the position-orientation calculating apparatus according to the first embodiment of the present invention. An image captured by the subjective view camera 100 (hereinafter referred to as a subjective view image) is supplied to the index detector 120 and the image mixer 160.

The objective view camera 110 shoots the physical space having the indices arranged therein, like the subjective view camera 100. The positions and orientations of the cameras in the objective view camera 110 are fixed on, for example, the ceiling and the positions and orientations of the viewpoints in the world coordinate system are known. Since the objective view camera 110 basically includes a plurality of cameras, the objective view camera 110 is referred to as the objective view camera "group". This is because the relative positional relationship between the objective view camera 110 and the indices is calculated by a triangular method, as described below with regard to the index position calculator 130. However, the objective view camera 110 may include one camera. This case will also be described below with regard to the index position calculator 130. A group of images (hereinafter referred to as a group of objective view images) captured by the objective view camera 110 is supplied to the index position calculator 130.

The index detector 120 receives the subjective view image from the subjective view camera 100 to detect the image coordinates of the indices in the subjective view image. For example, when the indices are markers having different colors, the index detector 120 detects the areas corresponding to the colors of the individual markers from the subjective view image and uses the positions of the center of mass of the detected areas as detection coordinates of the indices. Next, the index detector 120 acquires the identifications of the indices from the colors of the markers. When the indices are feature points having different textural features, the index detector 120 performs template matching with the template images of the indices, which template images being held as known information, for the subjective view image to detect the positions of the indices and to acquire the identifications of the indices. When the rectangular indices are used, the index detector 120 binarizes the image and labels the binarized image to detect regions formed of four straight lines from regions each having an area more than a predetermined area as index candidates. The index detector 120 determines whether there are predetermined patterns in the areas detected as the index candidates to prevent misdetection and to acquire the identifications of the indices. The rectangular indices detected in the manner described above are equivalent to the four indices corresponding to the four apexes.

After detecting the image coordinates of the indices from the subjective view image and acquiring the identifications of the indices, the index detector 120 supplies the image coordinates of the indices detected from the subjective view image and the identifications of the indices to the viewpoint position-orientation calculator 140.

The index position calculator 130 receives the group of objective view images from the objective view camera 110 to detect the image coordinates of the indices in the received images and the identifications of the indices, like the index detector 120. When the objective view camera 110 includes a plurality of cameras, the index position calculator 130 associates the image coordinates in the objective view images with each other based on the identifications. The index position calculator 130 calculates the positions or the positions and orientations in the world coordinate system of the indices in the received images from the association information. Since the positions and the orientations in the world coordinate system of the viewpoints of the cameras in the objective view camera 110 are known, calculating the relative positions or the relative positions and orientations of the indices with respect to the cameras allows the positions or the positions and orientations of the indices in the world coordinate system to be calculated.

The calculation of the relative positions of the indices with respect to the cameras in the objective view camera 110 is performed in a known method. The fact that the positions and orientations in the world coordinate system of the cameras in the objective view camera 110 are known means that the relative positional relationship between the cameras is known, so that the use of the triangular method allows easy calculation of the relative positions of the point indices shot by two or more cameras.

Even when the objective view camera 110 includes one camera, a method of using the image including a plurality of points whose relative positional relationship is known to yield a transformation matrix from the camera coordinate system to the coordinate system used in the description of the positional relationship of the multiple points can be used to calculate the relative positions and orientations of the indices from the detection results of the multiple apexes in one index, as long as the indices have a predetermined shape. Such methods are disclosed in Takahashi, Ishi, Makino, and Nakashizuka, "A high accuracy realtime 3D measuring method of marker for VR interface by monocular vision," 3D Image Conference 96, pp. 167-172, July 1996 (hereinafter Takahashi et al.) and in Junichi Rekimoto, "Augment Reality using the 2D matrix code," *Interactive System and Software IV*," Kindai-kagaku-sya, pp. 199-208, December 1996 (hereinafter Junichi Rekimoto).

In the methods disclosed in Takahashi et al. and Junichi Rekimoto, the features of the rectangular indices arranged on a plane are used to calculate the relative positions and orientations of the indices with respect to the camera. However, using a camera is not limited to the rectangular index arranged on a plane. Any shaped indices, in addition to the rectangular index, may be used as long as the positions and orientations of the indices can be determined based on the geometrical information concerning the indices and the geometrical information can be detected from the image. For example, the relative positions and orientations of the indices with respect to the camera may be calculated by using a method in which a cubic index whose faces are painted with different colors are used, two or three faces in the image are detected by color detection, ridges of the cubic index are detected, and the camera parameter is yielded from the above information by a direct liner transformation (DLT) method.

When the indices are arranged on a plane, detecting four or more points in each index allows the relative position and orientation of the index with respect to the camera to be calculated based on a two-dimensional holography calculation, without using the methods disclosed in Takahashi et al. or Junichi Rekimoto. A method of using six or more points in a three-dimensional index, which points are not arranged on the same plane, to calculate the relative position and orientation of the index with respect to the camera is also well known. Furthermore, a method of minimizing the difference between the theoretical value of a point in the image coordinate, which theoretical value is calculated from an estimate of the relative position and orientation of the index with respect to the camera, and the measured value of the point in the image coordinate by a repeated calculation, such as a Gauss-Newton method, using an image Jacobian to optimize the estimate may be used.

The calculation of the relative position and orientation of the index with respect to the camera by the index position calculator 130 when the objective view camera 110 includes one camera is based on the fact that yielding the orientations of indices whose relative positional relationship is known or the orientation of an index whose shape is known allows the positions of the indices or the positions of the apexes in the index to be calculated.

The position or the position and orientation in the world coordinate system of each index, calculated by the index position calculator 130, is supplied to the viewpoint position-orientation calculator 140 along with identification of each index.

The viewpoint position-orientation calculator 140 associates the image coordinate of the index, supplied from the index detector 120, with the position in the world coordinate system of the index, supplied from the index position calculator 130, based on the identification and calculates the position and/or orientation in the world coordinate system of the viewpoint of the subjective view camera 100 based on the association information. The calculation is performed in the same manner as in the calculation of the relative position and orientation of the index with respect to the camera when the objective view camera 110 includes one camera, described above with regard to the index position calculator 130.

Although the relative position and orientation of the group of indices having a predetermined positional relationship or of the index having a predetermined shape with respect to the camera is calculated in the above calculation, it is possible to calculate the relative position and orientation of the world coordinate system with respect to the camera, that is, the position and orientation of the viewpoint in the world coordinate system by a similar method on the assumption that "the multiple indices in the group of indices having the predetermined positional relationship or the multiple points in the index having the predetermined shape" correspond to "the group of indices or the group of points whose position in the world coordinate system is known. The calculated position and/or orientation in the world coordinate system of the viewpoint of the subjective view camera 100 are supplied to the virtual image generator 150.

The viewpoint position-orientation calculator 140 may calculate either the position or the orientation. In such a case, information concerning the one that is not calculated is held in the viewpoint position-orientation calculator 140. The viewpoint position-orientation calculator 140 substitutes the held information for the unknown variable corresponding to either the position or the orientation in the calculation of the position and orientation described above and uses only the remaining orientation or position as the unknown variable to perform the calculation. The calculated position or orientation is supplied to the virtual image generator 150 along with the orientation or position held in the viewpoint position-orientation calculator 140.

The virtual image generator 150 uses the position and/or orientation in the world coordinate system of the viewpoint of the subjective view camera 100, supplied from the viewpoint position-orientation calculator 140, and information concerning a virtual space, held in advance, to generate a virtual space image. Since the method of generating the virtual space image is well known, the description is omitted herein. The virtual space image generated by the virtual image generator 150 is supplied to the image mixer 160.

The image mixer 160 synthesizes the subjective view image supplied from the subjective view camera 100 with the virtual space image supplied from the virtual image generator 150 to generate a mixed reality image. The mixed reality image is supplied to the image display unit 170.

The image display unit 170 displays the mixed reality image supplied from the image mixer 160 to present the mixed reality to the user of the position-orientation calculating apparatus according to the first embodiment. The image display unit 170 may be integrated with the subjective view camera 100. In such a case, the subjective view camera 100 and the image display unit 170 is capable of serving as a so-called head mounted display.

Figure 2:
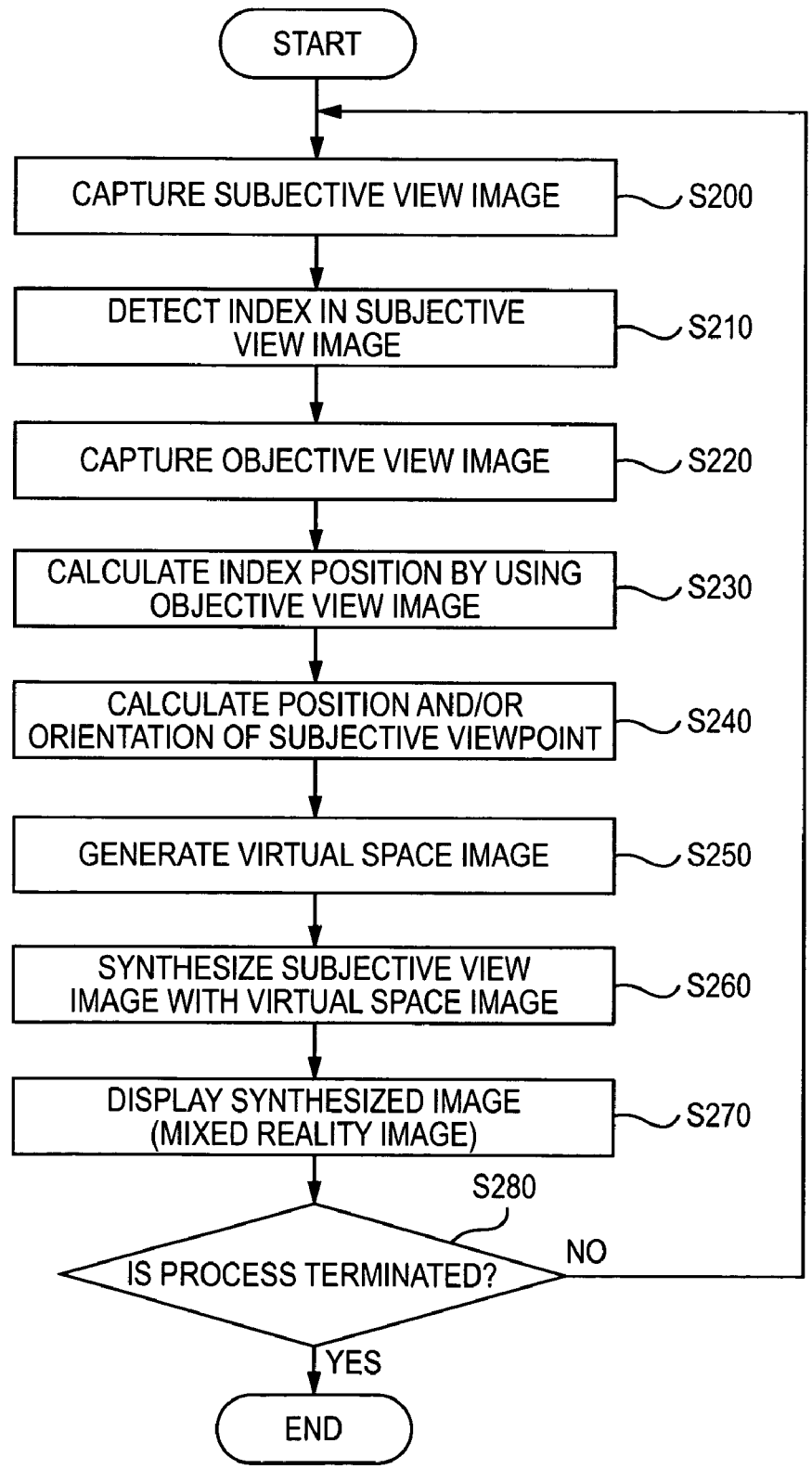
FIG. 2 is a flowchart showing a process of calculating the position and/or orientation of a camera viewpoint performed by the position-orientation calculating apparatus according to the first embodiment.

FIG. 2 is a flowchart showing a process of calculating the position and/or orientation of a camera viewpoint performed by the position-orientation calculating apparatus according to the first embodiment of the present invention. The program code following the flowchart is held in a memory, such as a random access memory (RAM) or a read only memory (ROM) (not shown), in the apparatus according to the first embodiment. The program code is read out by a central processing unit (CPU) (not shown) for execution.

Referring to FIG. 2, in Step S200, the subjective view camera 100 shoots the physical space and supplies a subjective view image that is captured to the index detector 120 and the image mixer 160.

In Step S210, the index detector 120 detects indices from the subjective view image and supplies the image coordinates and the identifications of the detected indices to the viewpoint position-orientation calculator 140.

In Step S220, the objective view camera 110 shoots the physical space and supplies a group of captured objective view images to the index position calculator 130.

In Step S230, after detecting the indices from the group of captured objective view images, the index position calculator 130 uses the image coordinates and the identifications of the detected indices to calculate the relative positional relationship of the indices with respect to each camera in the objective view camera 110. The relative positional relationship means the positions of the indices in the camera coordinate system of each camera in the objective view camera 110. The relative positional relationship is calculated in the manner described with regard to the index position calculator 130.

After calculating the relative positional relationship, the index position calculator 130 uses the position and/or orientation in the world coordinate system of each camera in the objective view camera 110, held in advance, to yield the positions in the world coordinate system of the indices from the calculated relative positional relationship. Specifically, the index position calculator 130 converts the calculated positions of the indices in the camera coordinate system of each camera in the objective view camera 110 into the positions of the indices in the world coordinate system. For example, on the assumption that the position and orientation in the world coordinate system of a camera A in the objective view camera 110, held in advance, is denoted by $t_A = [x_A y_A z_A \xi_A \psi_A \zeta_A]^T$ and a modeling transformation matrix defined by $t_A$ is denoted by $M_{WC_A}$, a position $x_{C_A}$ of the index in the camera coordinate system of the camera A is converted into a position $x_W = [xyz]^T$ of the index in the world coordinate system based on the following equation.

$$x_W = [x\ y\ z\ 1]^T = M_{WC_A} x_{C_A} \quad (1)$$

$M_{WC_A}$ is defined by the following expression.

$$M_{WC_A} = \begin{bmatrix} \frac{\xi_A^2}{\theta^2}(1-\cos\theta)+\cos\theta & \frac{\xi_A\psi_A}{\theta^2}(1-\cos\theta)-\frac{\zeta_A}{\theta}\sin\theta & \frac{\xi_A\zeta_A}{\theta^2}(1-\cos\theta)+\frac{\psi_A}{\theta}\sin\theta & x_A \\ \frac{\psi_A\xi_A}{\theta^2}(1-\cos\theta)+\frac{\zeta_A}{\theta}\sin\theta & \frac{\psi_A^2}{\theta^2}(1-\cos\theta)+\cos\theta & \frac{\psi_A\zeta_A}{\theta^2}(1-\cos\theta)-\frac{\xi_A}{\theta}\sin\theta & y_A \\ \frac{\zeta_A\xi_A}{\theta^2}(1-\cos\theta)-\frac{\psi_A}{\theta}\sin\theta & \frac{\zeta_A\psi_A}{\theta^2}(1-\cos\theta)+\frac{\xi_A}{\theta}\sin\theta & \frac{\zeta_A^2}{\theta^2}(1-\cos\theta)+\cos\theta & z_A \\ 0 & 0 & 0 & 1 \end{bmatrix} \quad (2)$$

However, the following equation is satisfied.

$$\theta = \sqrt{\xi_A^2 + \psi_A^2 + \zeta_A^2} \quad (3)$$

The calculated positions (coordinate values) in the world coordinate system of the indices are supplied to the viewpoint position-orientation calculator 140 along with the identifications corresponding to the positions.

When the objective view camera 110 includes a plurality of cameras, a plurality of positions in the world coordinate system is calculated for each index. In this case, the index position calculator 130 supplies the position of each index, yielded from the average value of the calculated positions of the cameras or from the combination of the index and the camera that is closest to the index.

Steps S220 and S230 may be performed before Step S200 or may be performed in parallel with Steps S200 and S210. In other words, the detection of the positions of the indices by using the objective view image in Steps S220 and S230 may be performed during the generation of the mixed reality image to update the positions of the indices in real time.

In Step S240, the viewpoint position-orientation calculator 140 associates the image coordinates of the indices in the subjective view image detected in Step S210 with the positions of the indices in the world coordinate system calculated in Step S230 based on the identifications. The viewpoint position-orientation calculator 140 then calculates the position and/or orientation in the world coordinate system of the viewpoint of the subjective view camera 100 based on the association information. Since the calculation is performed in the manner described with regard to the viewpoint position-orientation calculator 140, a detailed description of the calculation is omitted herein. The viewpoint position-orientation calculator 140 supplies the calculated position and/or orientation in the world coordinate system of the viewpoint of the subjective view camera 100 to the virtual image generator 150. If the position or orientation is not calculated, the viewpoint position-orientation calculator 140 supplies the orientation or position held therein in advance to the virtual image generator 150.

In Step S250, the virtual image generator 150 uses the position and/or orientation in the world coordinate system of the viewpoint of the subjective view camera 100, supplied from the viewpoint position-orientation calculator 140, and the information concerning a virtual space, held in advance, to generate a virtual space image. The virtual image generator 150 supplies the generated virtual space image to the image mixer 160.

In Step S260, the image mixer 160 synthesizes the image captured by the subjective view camera 100 with the virtual space image supplied from the virtual image generator 150 to generate a mixed reality image. The image mixer 160 supplies the generated mixed reality image to the image display unit 170.

In Step S270, the image display unit 170 displays the mixed reality image supplied from the image mixer 160 to present the mixed reality to the user.

In Step S280, it is determined whether the process performed by the position-orientation calculating apparatus according to the first embodiment is terminated. If the user instructs the position-orientation calculating apparatus to terminate the process, the process is terminated. If the user instructs the continuation of the process, the process goes back to Step S200.

The process is performed from Step S200 again. Since the positions of the indices in the world coordinate system are repeatedly calculated in Step S230, it is possible to calculate the position and/or orientation of the viewpoint of the subjective view camera 100 without problems, even when the user moves one or more indices to other positions. Similarly, when the indices are mounted on a small device that is capable of autonomous movement, it is possible to calculate the position and/or orientation of the viewpoint of the subjective view camera 100 without problems.

Situations in which the user moves the indices or the indices autonomously move include a case where the indices are not detected by the index detector 120. That is, for example, when an object (for example, the hand of the user or the object operated by the user) other than the indices in the physical space blocks the space between the index in the physical space and the viewpoint or when the indices are not included in the image due to a shift in the position or orientation of the subjective view camera 100, the user moves the indices or the indices autonomously move such that the indices are detected again by the index detector 120.

In the process described above, the position-orientation calculating apparatus according to the first embodiment of the present invention can continue to calculate the position and/or orientation of the viewpoint of the subjective view camera 100 even if the positions of the indices in the physical space, used in the process, are shifted.

Second Embodiment

A position-orientation calculating apparatus according to a second embodiment uses measurements given by a position measurement sensor to calculate the positions of indices in the physical space. A case where the position-orientation calculating apparatus and a position-orientation calculating method, according to the second embodiment, are used to present the mixed reality to a user is described below.

Figure 3:
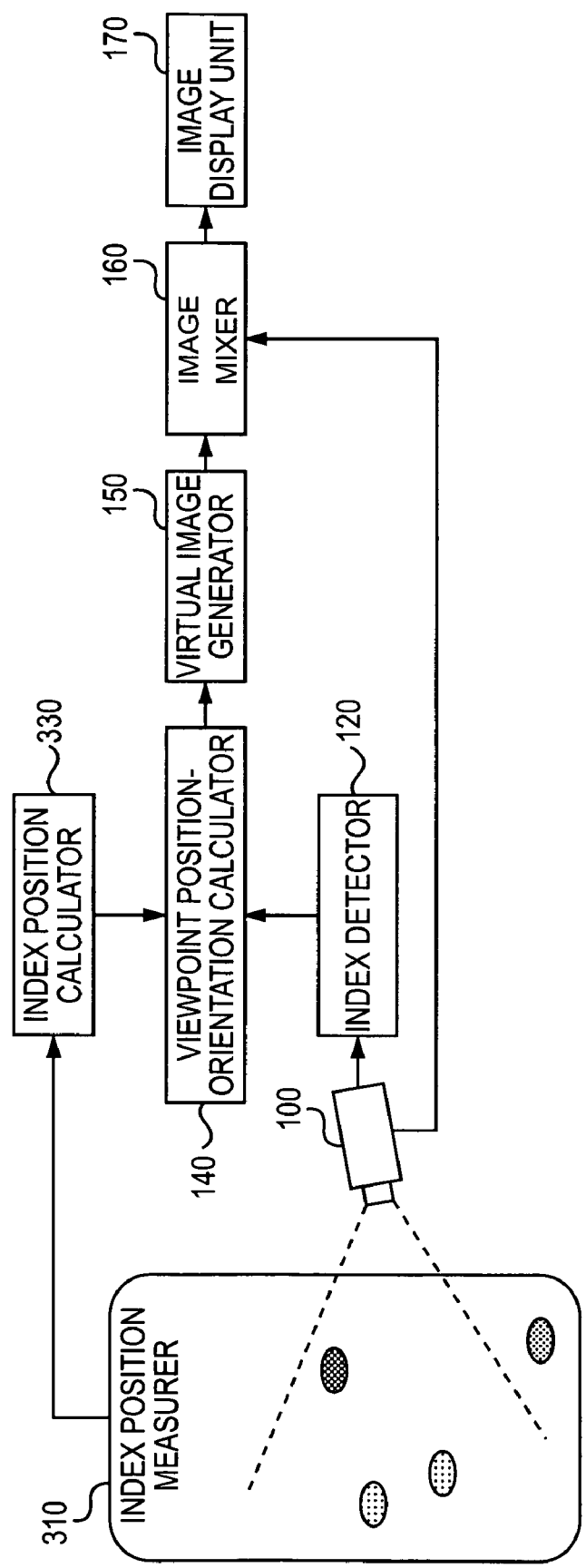
FIG. 3 illustrates an exemplary structure of a position-orientation calculating apparatus according to a second embodiment of the present invention.

FIG. 3 illustrates an exemplary structure of the position-orientation calculating apparatus according to the second embodiment. The same reference numerals or letters are used in FIG. 3 to identify the same components shown in FIG. 1. A detailed description of such components is not repeated here. Referring to FIG. 3, the position-orientation calculating apparatus according to the second embodiment includes a subjective view camera 100, an index position measurer 310, an index detector 120, an index position calculator 330, a viewpoint position-orientation calculator 140, a virtual image generator 150, an image mixer 160, and an image display unit 170.

The subjective view camera 100 shoots the physical space having the indices arranged therein. The viewpoint of the subjective view camera 100 is movable and the position and/or orientation of the viewpoint is a target of the position-orientation calculating apparatus according to the second embodiment of the present invention. A subjective view image captured by the subjective view camera 100 is supplied to the index detector 120 and the image mixer 160.

The index detector 120 receives the subjective view image from the subjective view camera 100 to detect the image coordinates of the indices in the subjective view image and to acquire the identifications of the indices. The index detector 120 supplies the detected image coordinates of the indices in the subjective view image and the identifications of the indices to the viewpoint position-orientation calculator 140.

The index position measurer 310 is a position measurement sensor for measuring the positions of the indices arranged in the physical space. The index position measurer 310 determines the identifications of the indices within an allowable measurement range and measures the positions of the indices. The positions are measured by any known manner. For example, a board that includes a plurality of coils and that is applied to, for example, a tablet may be used. The index position measurer 310 is not necessarily required to measure three-degree-of-freedom positions. The index position measurer 310 supplies the identifications and the measured positions to the index position calculator 330.

A plurality of indices which are shot by the subjective view camera 100 and whose positions in the world coordinate system are unknown is arranged in the allowable measurement range of the index position measurer 310.

The indices may be circular or elliptical markers having different colors or may be feature points having different textural features, as in the first embodiment. Alternatively, rectangular indices that are rectangular monochrome areas each having a certain area may be used. However, the positions of the indices need to be measured by the index position measurer 310. When the index position measurer 310 is the board including the multiple coils, it is necessary for each index to include a resonant circuit including coils and capacitors. In this case, the index position measurer 310 is capable of measuring the two-dimensional positions of the indices on the board by electromagnetic induction.

As in the first embodiment, the indices are capable of being moved by a user of the position-orientation calculating apparatus according to the second embodiment. Alternatively, the indices may be mounted on a small device that is capable of autonomous movement to move the indices without any operation of the user.

The index position calculator 330 calculates the positions of the indices in the world coordinate system from the measurements of the positions of the indices, supplied from the index position measurer 310, and the position and orientation in the world coordinate system of the index position measurer 310 held therein in advance. The calculated position of each index in the world coordinate system is supplied to the viewpoint position-orientation calculator 140 along with the identification of the index.

The viewpoint position-orientation calculator 140 associates the image coordinates of the index, supplied from the index detector 120, with the position in the world coordinate system of the index, supplied from the index position calculator 330, based on the identification to calculate the position and/or orientation in the world coordinate system of the viewpoint of the subjective view camera 100 based on the association information. The calculated position and/or orientation in the world coordinate system of the viewpoint of the subjective view camera 100 are supplied to the virtual image generator 150.

When the viewpoint position-orientation calculator 140 calculates either of the position or the orientation, the information concerning the one that is not calculated is held in the viewpoint position-orientation calculator 140. The information is supplied to the virtual image generator 150 along with the calculated position or the orientation.

The virtual image generator 150, the image mixer 160, and the image display unit 170 function in the same manner as in the first embodiment.

Figure 4:
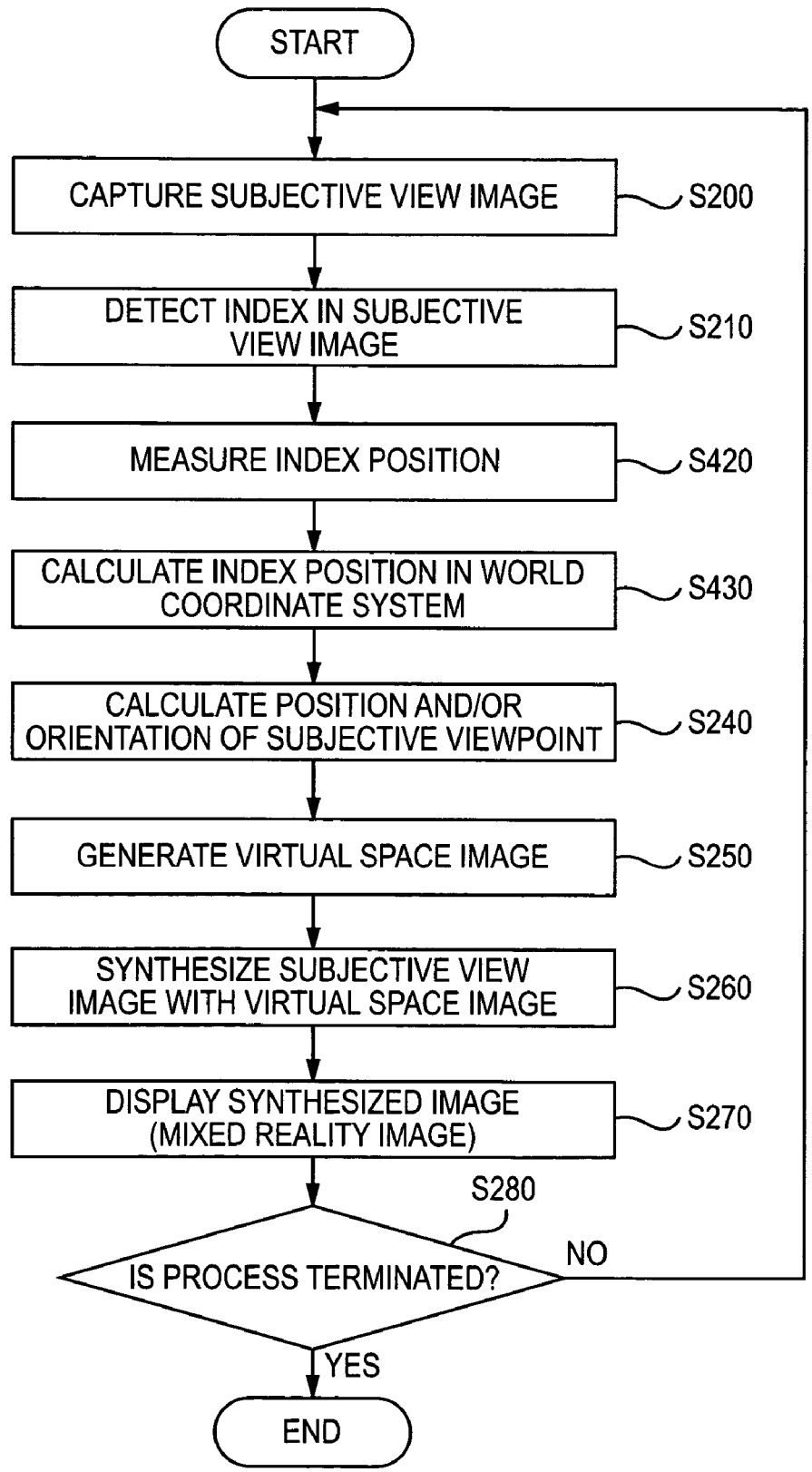
FIG. 4 is a flowchart showing a process of calculating the position and/or orientation of a camera viewpoint performed by the position-orientation calculating apparatus according to the second embodiment.

FIG. 4 is a flowchart showing a process of calculating the position and/or orientation of a camera viewpoint performed by the position-orientation calculating apparatus according to the second embodiment of the present invention. The same reference numerals or letters are used in FIG. 4 to indicate the steps shown in FIG. 2. A detailed description of such steps is not repeated here. The program code following the flowchart is held in a memory, such as a RAM or a ROM (not shown), in the apparatus according to the second embodiment. The program code is read out by a CPU (not shown) for execution.

Referring to FIG. 4, in Step S200, the subjective view camera 100 shoots the physical space and supplies a subjective view image that is captured to the index detector 120 and the image mixer 160.

In Step S210, the index detector 120 detects indices from the subjective view image and supplies the image coordinates and the identifications of the detected indices to the viewpoint position-orientation calculator 140.

In Step S420, the index position measurer 310 measures the positions of the indices in a sensor coordinate system (a coordinate system which the index position measurer 310 uses for the measurement) and recognizes the identifications of the measured indices. The index position measurer 310 supplies the measured positions and the identifications to the index position calculator 330.

The positions of the indices are measured by any known manner. When the index position measurer 310 is the board including the multiple coils and each of the indices includes the resonant circuit, the positions of the indices in the sensor coordinate system are measured in the following manner.

First, the index position measurer 310 applies a current to the coils included therein. A magnetic field is generated around the index position measurer 310. When the indices are arranged around the index position measurer 310, energy is saved in the resonant circuit in the index owing to the generated magnetic field. Next, the index position measurer 310 stops the current applied to the coils included therein. A magnetic field is generated in the resonant circuit in the index with the energy saved in the resonant circuit in the index. The index position measurer 310 detects the magnetic field generated in the index by using the included coils and assumes the position of the detected magnetic field as the measurement of the position of the index. The index position measurer 310 repeats the above processing at high speed to continue to measure the position of the indices.

In Step S430, the positions of the indices in the world coordinate system are detected. Specifically, the positions of the indices in the sensor coordinate system, measured in Step S420, are converted into the positions of the indices in the world coordinate system. The conversion is performed in the same manner as in the conversion of the positions of the indices in the camera coordinate system into the positions of the indices in the world coordinate system in Step S230 in the first embodiment. That is, the modeling transformation matrix in the sensor coordinate system, which matrix is held in advance and is defined by the positions and orientations of the indices in the world coordinate system is multiplied by the positions of the indices in the sensor coordinate system, measured in Step S420, to yield the positions of the indices in the world coordinate system.

The yielded positions (coordinate values) of the indices in the world coordinate system are supplied to the viewpoint position-orientation calculator 140 along with the identifications corresponding to the indices.

Steps S420 and S430 may be performed before Step S200 or may be performed in parallel with Steps S200 and S210.

The subsequent steps from S240 to S270 are the same as in the process in the first embodiment.

In Step S280, it is determined whether the process performed by the position-orientation calculating apparatus according to the second embodiment is terminated. If the user instructs the position-orientation calculating apparatus to terminate the process, the process is terminated. If the user instructs the continuation of the process, the process goes back to Step S200.

The process is performed from Step S200 again. Since the positions of the indices in the world coordinate system are repeatedly calculated in Step S430, it is possible to calculate the position and/or orientation of the viewpoint of the subjective view camera 100 without problems, even when the user moves one or more indices to other positions. Similarly, when the indices are mounted on a small device that is capable of autonomous movement, it is possible to calculate the position and/or orientation of the viewpoint of the subjective view camera 100 without problems. Situations in which the user moves the indices or the indices autonomously move are similar to the cases in the first embodiment.

In the process described above, the position-orientation calculating apparatus according to the second embodiment of the present invention can continue to calculate the position and/or orientation of the viewpoint of the subjective view camera 100 even if the positions of the indices in the physical space, used in the process, are shifted.

Third Embodiment

A position-orientation calculating apparatus according to a third embodiment has indices electronically arranged in the physical space and calculates the positions of the indices without using an objective view camera or a position measurement sensor. A case where the position-orientation calculating apparatus and a position-orientation calculating method, according to the third embodiment, are used to present the mixed reality to a user is described below.

Figure 5:
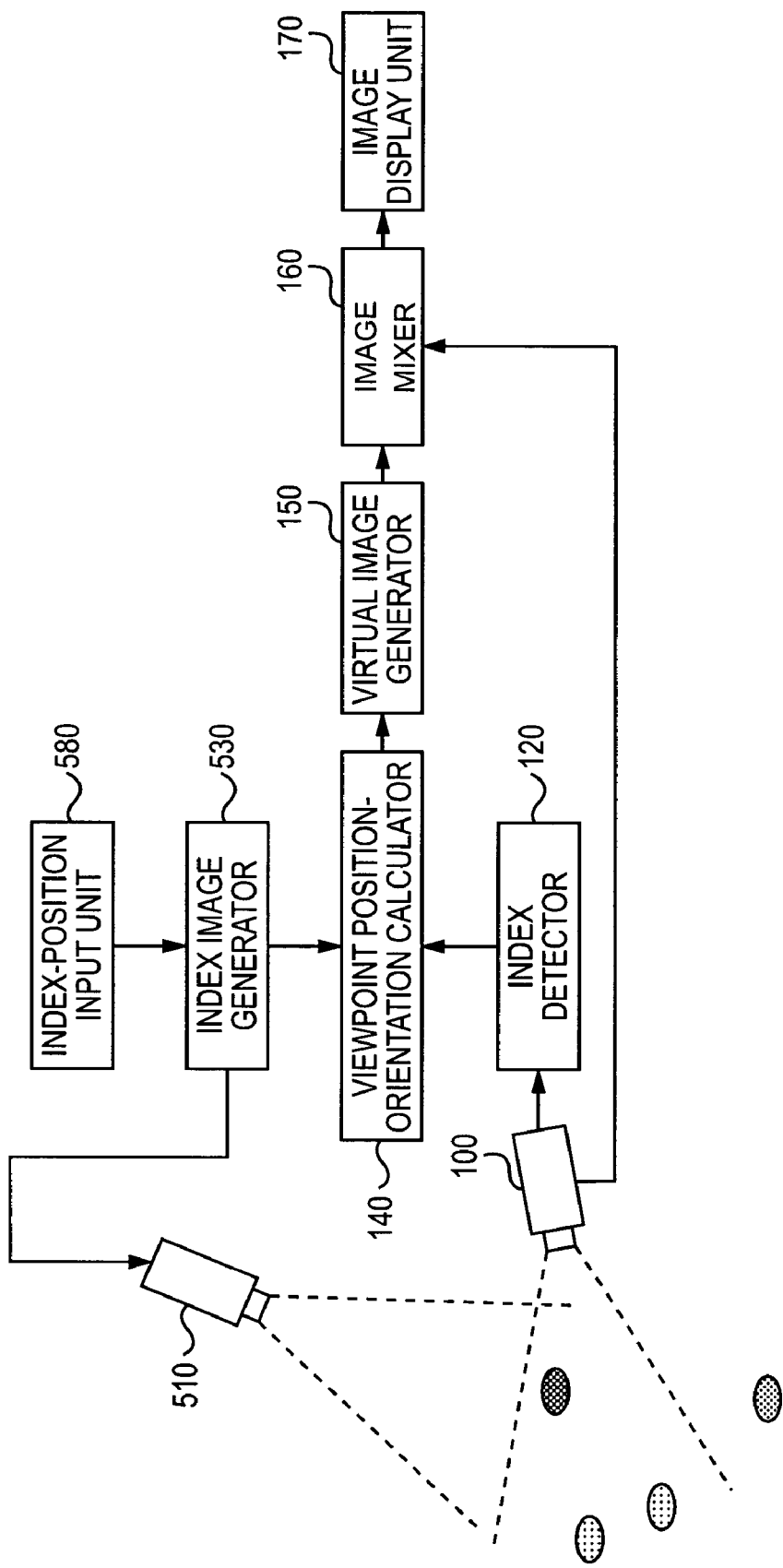
FIG. 5 illustrates an exemplary structure of a position-orientation calculating apparatus according to a third embodiment of the present invention.
Figure 6:
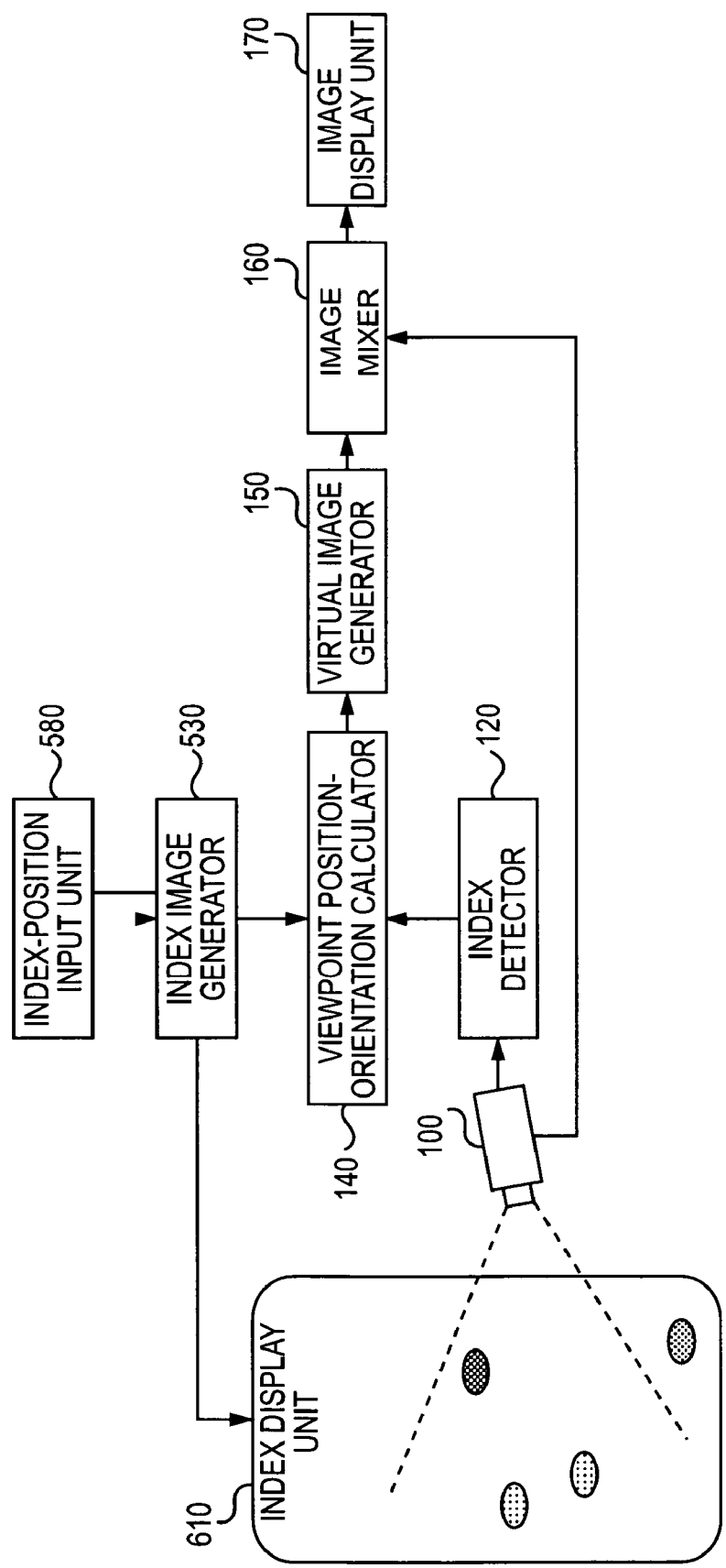
FIG. 6 illustrates another exemplary structure of the position-orientation calculating apparatus according to the third embodiment of the present invention.

FIGS. 5 and 6 illustrate exemplary structures of the position-orientation calculating apparatus according to the third embodiment. The same reference numerals or letters are used in FIGS. 5 and 6 to identify the same components shown in FIG. 1. A detailed description of such components is not repeated here. Referring to FIGS. 5 and 6, the position-orientation calculating apparatus according to the third embodiment includes a subjective view camera 100, an index projecting unit 510 and/or an index display unit 610, an index detector 120, an index image generator 530, a viewpoint position-orientation calculator 140, a virtual image generator 150, an image mixer 160, an image display unit 170, and an index-position input unit 580.

The subjective view camera 100 shoots the physical space on which the indices are projected by the index projecting unit 510 and/or the physical space in which the indices are displayed by the index display unit 610. The viewpoint of the subjective view camera 100 is movable and the position and/or orientation of the viewpoint is a target of the position-orientation calculating apparatus according to the third embodiment of the present invention. A subjective view image captured by the subjective view camera 100 is supplied to the index detector 120 and the image mixer 160.

The index detector 120 receives the subjective view image from the subjective view camera 100 to detect the image coordinates of the indices in the subjective view image and to acquire the identifications of the indices. The index detector 120 supplies the detected image. coordinates of the indices in the subjective view image and the identifications of the indices to the viewpoint position-orientation calculator 140.

The index-position input unit 580 is operated by the user and supplies the positions (coordinate values) of the indices in the world coordinate system to the index image generator 530. For example, the index-position input unit 580 may be a keyboard or may be a system, such as a stereoscopic objective view camera, for recognizing positions specified by the user in the physical space.

The index image generator 530 holds shape information concerning the physical space. The space information includes the positions of the indices in the world coordinate system and the position and orientation in the world coordinate system of the index projecting unit 510 and/or the index display unit 610. The index image generator 530 uses the shape information to generate an index image which the index projecting unit 510 projects on the physical space and/or an index image which the index display unit 610 displays in the physical space. When the generated index image is projected on the physical space by the index projecting unit 510 and/or when the index image is displayed in the physical space by the index display unit 610, the image features of the indices are projected and/or displayed at the positions of the indices in the world coordinate system, held in the index image generator 530. Since a method of generating such image is known, as introduced in "Alternative Augmented Reality Approaches: Concepts, Techniques and Applications," *EUROGRAPHICS* 2003, Granada Spain, a description is omitted herein. The index image generator 530 supplies the index image to the index projecting unit 510 and/or the index display unit 610.

The positions of the indices in the world coordinate system, held in the index image generator 530, may be changed in response to inputs with the index-position input unit 580. Accordingly, the user is capable of freely shifting the positions of the indices projected on and/or displayed in the physical space. Alternatively, the index image generator 530 may autonomously shift the positions of the indices in the world coordinate system.

The index image generator 530 supplies the positions of the indices in the world coordinate system, held therein, to the viewpoint position-orientation calculator 140 along with the identifications of the indices.

The index projecting unit 510 in FIG. 5 is a projector whose position and orientation in the world coordinate system is known and projects an index image on the physical space. The index display unit 610 in FIG. 6 is, for example, a display whose position and orientation in the world coordinate system is known and displays an index image in the physical space.

The position-orientation calculating apparatus according to the third embodiment may include either the index projecting unit 510 or the index display unit 610, as shown in FIGS. 5 and 6, or may include both the index projecting unit 510 and the index display unit 610.

The index image, which is generated by the index image generator 530, includes the image features of the indices used in the calculation of the position and/or orientation in the world coordinate system of the viewpoint of the subjective view camera 100. When the index image is projected on the physical space by the index projecting unit 510, the image features of the indices are projected at the positions of the indices in the world coordinate system, held in the index image generator 530. When the index image is displayed in the physical space by the index display unit 610, the image features of the indices are displayed at the positions of the indices in the world coordinate system, held in the index image generator 530.

The indices in the index image may be circular or elliptical markers having different colors or may be feature points having different textural features, as in the first embodiment. Alternatively, rectangular indices that are rectangular monochrome areas each having a certain area may be used.

The projected positions of the indices are capable of being controlled with the index-position input unit 580. Hence, the indices are capable of being moved by the user of the position-orientation calculating apparatus according to the third embodiment, as in the first and second embodiments.

The viewpoint position-orientation calculator 140 associates the image coordinates of the indices, supplied from the index detector 120, with the positions in the world coordinate system of the indices, supplied from the index image generator 530, based on the identifications to calculate the position and/or orientation in the world coordinate system of the viewpoint of the subjective view camera 100 based on the association information. The calculated position and/or orientation in the world coordinate system of the viewpoint of the subjective view camera 100 are supplied to the virtual image generator 150.

The virtual image generator 150, the image mixer 160, and the image display unit 170 function in the same manner as in the first embodiment.

Figure 7:
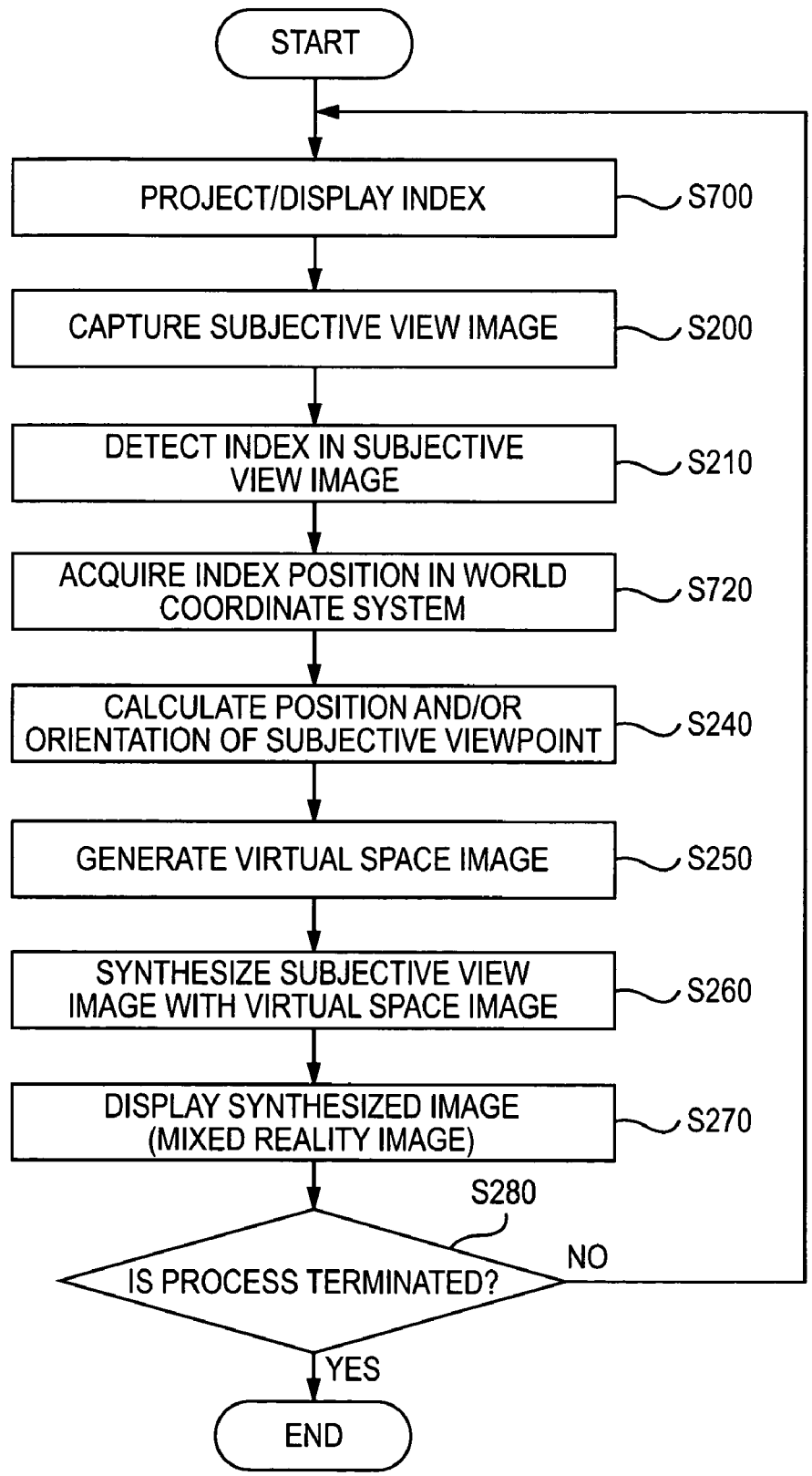
FIG. 7 is a flowchart showing a process of calculating the position and/or orientation of a camera viewpoint performed by the position-orientation calculating apparatus according to the third embodiment.

FIG. 7 is a flowchart showing a process of calculating the position and/or orientation of a camera viewpoint performed by the position-orientation calculating apparatus according to the third embodiment of the present invention. The same reference numerals or letters are used in FIG. 7 to indicate the steps shown in FIG. 2. A detailed description of such steps is not repeated here. The program code following the flowchart is held in a memory, such as a RAM or a ROM (not shown), in the apparatus according to the third embodiment. The program code is read out by a CPU (not shown) for execution.

Referring to FIG. 7, in Step S700, the index image generator 530 generates an index image and, then, the index projecting unit 510 projects the index image on the physical space and/or the index display unit 610 displays the index image in the physical space. This step projects and/or displays the image features of indices at the positions of the indices in the world coordinate system, held in the index image generator 530.

In Step S200, the subjective view camera 100 shoots the physical space and supplies a subjective view image that is captured to the index detector 120 and the image mixer 160.

In Step S210, the index detector 120 detects indices projected on and/or displayed in the physical space from the subjective view image and supplies the image coordinates and the identifications of the detected indices to the viewpoint position-orientation calculator 140.

In Step S720, the positions (coordinate values) in the world coordinate system of the indices projected on and/or displayed in the physical space and the identifications of the indices are supplied to the viewpoint position-orientation calculator 140.

The subsequent steps from S240 to S270 are the same as in the process in the first embodiment.

In Step S280, it is determined whether the process performed by the position-orientation calculating apparatus according to the third embodiment is terminated. If the user instructs the position-orientation calculating apparatus to terminate the process, the process is terminated. If the user instructs the continuation of the process, the process goes back to Step S700.

The process is performed from Step S700 again. The user is capable of freely shifting the positions of the indices projected on and/or displayed in the physical space with the index-position input unit 580 at any timing during the process. Specifically, when new information concerning the positions of the indices is input with the index-position input unit 580, the positions of the indices in the world coordinate system, held in the index image generator 530, are changed and the positions of the indices projected on and/or displayed in the physical space are shifted in response to the change in the positions of the indices in the world coordinate system. Since the positions (coordinate values) of the indices in the world coordinate system, supplied to the viewpoint position-orientation calculator 140 in Step S720, are also changed, it is possible to calculate the position and/or orientation of the viewpoint of the subjective view camera 100 without problems, even when the user moves one or more indices to other positions. Similarly, when the index image generator 530 autonomously moves the indices, it is possible to calculate the position and/or orientation of the viewpoint of the subjective view camera 100 without problems. Situations in which the user moves the indices or the indices autonomously move are similar to the cases in the first embodiment.

In the process described above, the position-orientation calculating apparatus according to the third embodiment of the present invention can continue to calculate the position and/or orientation of the viewpoint of the subjective view camera 100 even if the positions of the indices in the physical space, used in the process, are shifted.

Other Embodiments

The present invention can be embodied by supplying a storage medium (or a recording medium) having the program code (software) realizing the functions according to the above embodiments to a system or an apparatus, the computer (or the CPU or the micro processing unit (MPU)) in which the system or apparatus reads out and executes the program code stored in the storage medium. In this case, the program code itself read out from the storage medium realizes the functions of the embodiments described above. The present invention is applicable to the storage medium having the program code stored therein. The computer that executes the readout program code realizes the functions of the embodiments described above. In addition, the operating system (OS) or the like running on the computer may execute all or part of the actual processing based on instructions in the program code to realize the functions of the embodiments described above.

Alternatively, after the program code read out from the storage medium has been written in a memory that is provided in an expansion board included in the computer or in an expansion unit connected to the computer, the CPU or the like in the expansion board or the expansion unit may execute all or part of the actual processing based on instructions in the program code to realize the functions of the embodiments described above.

When the present invention is applied to the storage medium, the program code corresponding to the flowcharts described above (shown in FIG. 2, FIG. 4, and/or FIG. 7) is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-281310 filed Sep. 28, 2004, which is hereby incorporated by reference herein in its entirety.

What is claimed is:

1. An information processing method comprising:

acquiring a first image of an index arranged in a physical space, wherein the first image is captured by a first image capturing unit having a known position and orientation in a first coordinate system, and a position or a position and orientation of the index is unknown;

calculating arrangement information indicating a position or a position and orientation of the index in the first coordinate system, the arrangement information being calculated based on the first image and the known position and orientation of the first image capturing unit;

capturing a second image of the index in the physical space using a second image capturing unit, wherein the second image capturing unit is movable, a positional relationship between the second image capturing unit and the first image capturing unit is unfixed, and the position and/or orientation of the second image capturing unit is unknown;

detecting an image coordinate of the index from the second image in a second coordinate system; and calculating the position and/or orientation of a viewpoint of the second image by associating the image coordinate of the index in the second coordinate system with the arrangement information indicating the position or position and orientation of the index in the first coordinate system.

2. The information processing method according claim 1, wherein the arrangement information is information indicating the position or the position and orientation in a world coordinate system, and wherein calculating the position and/or orientation of the viewpoint of the captured second image is performed in the world coordinate system.

3. The information processing method according to claim 1, wherein the arrangement information is acquired from an image captured by a first image capturing unit whose position and orientation in the world coordinate system are known.

4. The information processing method according to claim 1, wherein the arrangement information is acquired based on an output from an index arrangement measuring unit that measures the position or the position and orientation of the index.

5. The information processing method according to claim 1, wherein the position or the position and orientation of the index in the physical space is variable.

6. A non-transitory storage medium storing a program for an information processing apparatus to perform the information processing method according to claim 1.

7. An information processing method comprising:

generating an index image from a position of an index in a first coordinate system and a position and orientation of a projection unit;

projecting the generated index image on a physical space using the projection unit;

capturing an image of the projected index image in the physical space using an image capturing unit, wherein the image capturing unit is movable, a positional relationship between the image capturing unit and the projection unit is unfixed, and a position and/or orientation of the image capturing unit is unknown;

detecting an image coordinate of the projected index image from the image in a second coordinate system; and calculating the position and/or orientation of a viewpoint of the image by associating the image coordinate of the projected index image in the second coordinate system with the arrangement information indicating the position of the index in the first coordinate system.

8. The information processing method according to claim 7, further comprising changing a projection condition of the index.

9. A non-transitory storage medium storing a program for an information processing apparatus to perform the information processing method according to claim 7.

10. An information processing apparatus comprising:

a first image capturing unit configured to capture a first image of an index arranged in a physical space, wherein the first image capturing unit has a known position and orientation in a first coordinate system, and a position or a position and orientation of the index is unknown;

an index-arrangement calculating unit configured to calculate arrangement information indicating the position or the position and orientation of the index in the first coordinate system, the arrangement information being calculated based on the first image and the known position and orientation of the first image capturing unit;

a second image capturing unit configured to capture a second image of the index in the physical space, wherein the second image capturing unit is movable, a positional relationship between the second image capturing unit and the first image capturing unit is unfixed, and the position and/or orientation of the second image capturing unit is unknown;

an index detecting unit configured to detect an image coordinate of the index from the second image in a second coordinate system; and a viewpoint position-orientation calculating unit configured to calculate the position and/or orientation of a viewpoint of the second image by associating the image coordinate of the index in the second coordinate system with the arrangement information indicating the position or position and orientation of the index in the first coordinate system.

11. The information processing apparatus according to claim 10, wherein the first capturing unit includes a plurality of image capturing units.

12. The information processing apparatus according to claim 10, wherein the first capturing unit is fixed in the physical space.

13. The information processing apparatus according to claim 10, wherein the index is a real object whose position or position and orientation in the physical space is variable.

14. The information processing apparatus according to claim 10, wherein the index is capable of autonomous movement in the physical space.

15. An information processing apparatus comprising:

an index image generating unit configured to generate an index image from a position of an index in a first coordinate system and a position and orientation of a projection unit;

an index projecting unit configured to project the generated index image on a physical space;

a capturing unit configure to capture an image of the projected index image in the physical space using an image capturing unit, wherein the capturing unit is movable, a positional relationship between the image capturing unit and the projection unit is unfixed, and a position and/or orientation of the capturing unit is unknown;

an index detecting unit configured to detect an image coordinate of the projected index image from the captured image in a second coordinate system; and a viewpoint position-orientation calculating unit configured to calculate the position and/or orientation of a viewpoint of the captured image by associating the image coordinate of the projected index image in the second coordinate system with the arrangement information indicating the position of the index in the first coordinate system.

* * * * *